US012602442B2

(12) United States Patent (10) Patent No.: US 12,602,442 B2
Chang (45) Date of Patent: Apr. 14, 2026

(54) MEDIA CONTENT PROCESSING METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Yaning Chang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 18/912,817

(22) Filed: Oct. 11, 2024

(65) Prior Publication Data

US 2025/0036697 A1 Jan. 30, 2025

Related U.S. Application Data

(63) Continuation of application No. PCT/CN2023/090511, filed on Apr. 25, 2023.

(30) Foreign Application Priority Data

Nov. 28, 2022 (CN) .......................... 202211502536.4

(51) Int. Cl.
*G06F 16/9535* (2019.01)
(52) U.S. Cl.
CPC ................................ *G06F 16/9535* (2019.01)
(58) Field of Classification Search
CPC .. G06F 16/9535; G06F 16/9024; Y02D 10/00
See application file for complete search history.

(56) References Cited

U.S. PATENT DOCUMENTS 11,106,715 B1 * 8/2021 Ju ........................... G06N 5/046
2015/0169758 A1 * 6/2015 Assom .................... G06F 16/36
707/603

(Continued)

FOREIGN PATENT DOCUMENTS

CN 110263180 A 9/2019
CN 112084405 A 12/2020

(Continued)

OTHER PUBLICATIONS

The World Intellectual Property Organization (WIPO) International Search Report for PCT/CN2023/090511 Aug. 4, 2023 5 Pages (including translation).

*Primary Examiner* — Etienne P Leroux
*Assistant Examiner* — Oscar Wehovz
(74) *Attorney, Agent, or Firm* — Anova Law Group, PLLC

(57) ABSTRACT

A media content processing method includes obtaining a first heterogeneous graph and a second heterogeneous graph. Obtaining the first heterogeneous graph includes constructing a first meta-path. The first meta-path includes a first start information node representing historical query information and at least one first other information node representing media information. The media information includes one media content and associated information about the media content. The media content is in a query result corresponding to the historical query information and is operated by a user. Obtaining the second heterogeneous graph includes constructing a second meta-path. The second meta-path includes a second start information node representing the media content and at least one second other information node representing the query information or the associated information. The method further includes determining and storing, based on the first heterogeneous graph and the (Continued)

S201: Obtain a first heterogeneous graph by constructing at least one first meta-path, where the first meta-path includes a start information node representing historical query information and at least one another information node representing media information, the media information includes media content and associated information about the media content, and the media content is media content operated by a user in a query result corresponding to the historical query information — S201

Obtain a second heterogeneous graph by constructing at least one second meta-path, where the second meta-path includes a start information node representing the media content and at least one another information node representing the query information or the associated information — S202

Determine and store, based on the first heterogeneous graph and the second heterogeneous graph, representation information corresponding to each media content, where the representation information is configured for matching media content when target query information is received — S203 second heterogeneous graph, representation information corresponding to the media content.

18 Claims, 4 Drawing Sheets

(56)                    References Cited

U.S. PATENT DOCUMENTS

2017/0244778 A1*    8/2017  Zhu ........................ H04L 67/10
2021/0365500 A1*   11/2021  Gunaselara ........... G06F 40/284
2024/0211512 A1     6/2024  Wu et al.

FOREIGN PATENT DOCUMENTS

CN          114329028  A       4/2022
CN          115238126  A      10/2022
WO      WO-2024035518 A1 *   2/2024   ............. G06N 5/041

* cited by examiner

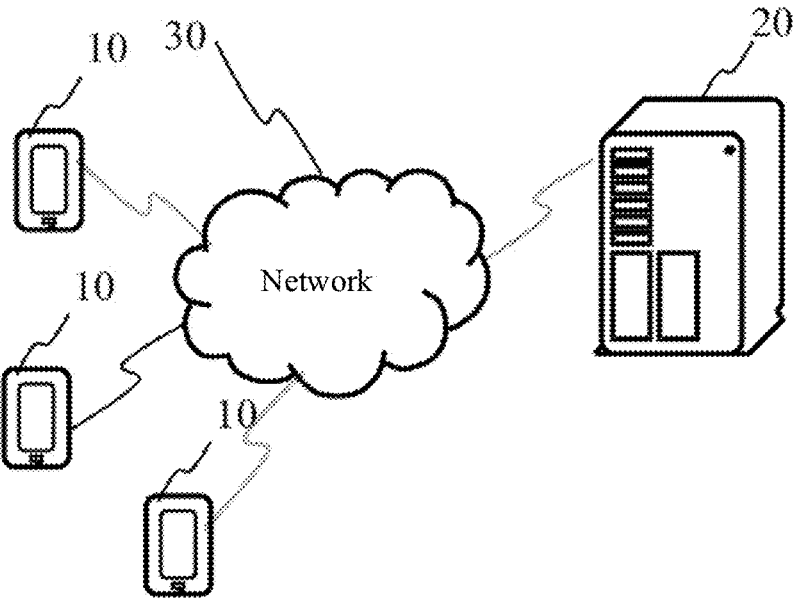

FIG. 1

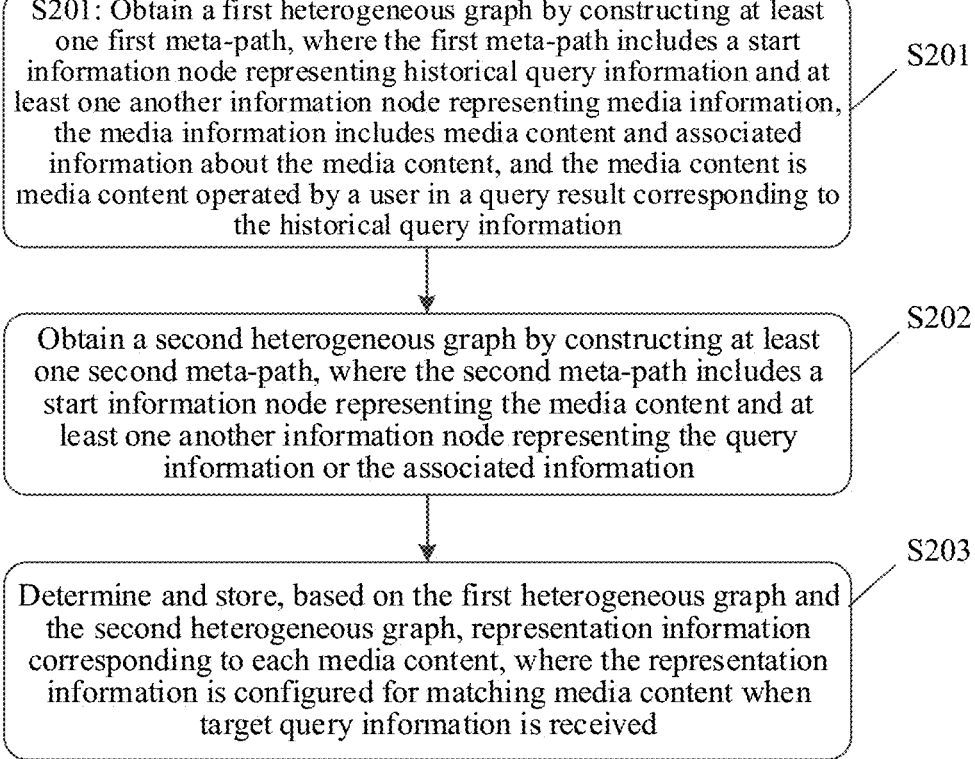

S201: Obtain a first heterogeneous graph by constructing at least one first meta-path, where the first meta-path includes a start information node representing historical query information and at least one another information node representing media information, the media information includes media content and associated information about the media content, and the media content is media content operated by a user in a query result corresponding to the historical query information

S201

Obtain a second heterogeneous graph by constructing at least one second meta-path, where the second meta-path includes a start information node representing the media content and at least one another information node representing the query information or the associated information

S202

Determine and store, based on the first heterogeneous graph and the second heterogeneous graph, representation information corresponding to each media content, where the representation information is configured for matching media content when target query information is received

MEDIA CONTENT PROCESSING METHOD AND APPARATUS, STORAGE MEDIUM, AND ELECTRONIC DEVICE

CROSS-REFERENCE TO RELATED APPLICATIONS

This application is a continuation of International Application No. PCT/CN2023/090511, filed on Apr. 25, 2023, which claims priority to Chinese Patent Application No. 202211502536.4, entitled "MEDIA CONTENT PROCESSING METHOD AND APPARATUS, STORAGE MEDIUM, AND ELECTRONIC DEVICE" and filed with the China National Intellectual Property Administration on Nov. 28, 2022, the entire contents of both of which are incorporated herein by reference.

FIELD OF THE TECHNOLOGY

Embodiments of this application relate to the field of computer technologies, and in particular, to a media content processing method and apparatus, a storage medium, and an electronic device.

BACKGROUND OF THE DISCLOSURE

In the field of media content recommendation, based on query requirement information inputted by a user, a media content recommendation model may recommend adapted media content to the user based on the query requirement information, to satisfy a media content query requirement of the user. Generally, the media content recommendation model may recommend media content in a text retrieval manner. However, this may limit a recommendation process strictly. For queries of some pieces of query requirement information, a situation in which proper media content cannot be retrieved while similar words with consistent intentions are inputted may occur.

SUMMARY

In accordance with the disclosure, there is provided a media content processing method including obtaining a first heterogeneous graph and a second heterogeneous graph. Obtaining the first heterogeneous graph includes constructing a first meta-path. The first meta-path includes a first start information node representing historical query information and at least one first other information node representing media information. The media information includes one media content and associated information about the media content. The media content is in a query result corresponding to the historical query information and is operated by a user. Obtaining the second heterogeneous graph includes constructing a second meta-path. The second meta-path includes a second start information node representing the media content and at least one second other information node representing the query information or the associated information. The method further includes determining and storing, based on the first heterogeneous graph and the second heterogeneous graph, representation information corresponding to the media content.

Also in accordance with the disclosure, there is provided an electronic device including at least one memory storing one or more instructions and at least one processor communicatively connected to the at least one memory and configured to execute the one or more instructions to obtain a first heterogeneous graph and a second heterogeneous graph.

Obtaining the first heterogeneous graph includes constructing a first meta-path. The first meta-path includes a first start information node representing historical query information and at least one first other information node representing media information. The media information includes one media content and associated information about the media content. The media content is in a query result corresponding to the historical query information and is operated by a user. Obtaining the second heterogeneous graph includes constructing a second meta-path. The second meta-path includes a second start information node representing the media content and at least one second other information node representing the query information or the associated information. The at least one processor is configured to execute the one or more instructions to determine and store, based on the first heterogeneous graph and the second heterogeneous graph, representation information corresponding to the media content.

Also in accordance with the disclosure, there is provided a non-transitory computer-readable storage medium storing at least one instruction or at least one program that, when loaded and executed by at least one processor, causes the at least one processor to obtain a first heterogeneous graph and a second heterogeneous graph. Obtaining the first heterogeneous graph includes constructing a first meta-path. The first meta-path includes a first start information node representing historical query information and at least one first other information node representing media information. The media information includes one media content and associated information about the media content. The media content is in a query result corresponding to the historical query information and is operated by a user. Obtaining the second heterogeneous graph includes constructing a second meta-path. The second meta-path includes a second start information node representing the media content and at least one second other information node representing the query information or the associated information. The at least one instruction or at least one program further causes the at least one processor to determine and store, based on the first heterogeneous graph and the second heterogeneous graph, representation information corresponding to the media content.

BRIEF DESCRIPTION OF THE DRAWINGS

To describe technical solutions and advantages in embodiments of this application or in the related art more clearly, the following briefly describes the accompanying drawings required for describing the embodiments or the related art. Apparently, the accompanying drawings in the following descriptions show merely some embodiments of this application, and a person of ordinary skill in the art may still derive other accompanying drawings from these accompanying drawings without creative efforts.

FIG. 1 is a schematic diagram of an implementation framework of a media content processing system according to an embodiment of this application.

FIG. 2 is a schematic flowchart of a media content processing method according to an embodiment of this application.

DESCRIPTION OF EMBODIMENTS

Figures 3, 4:
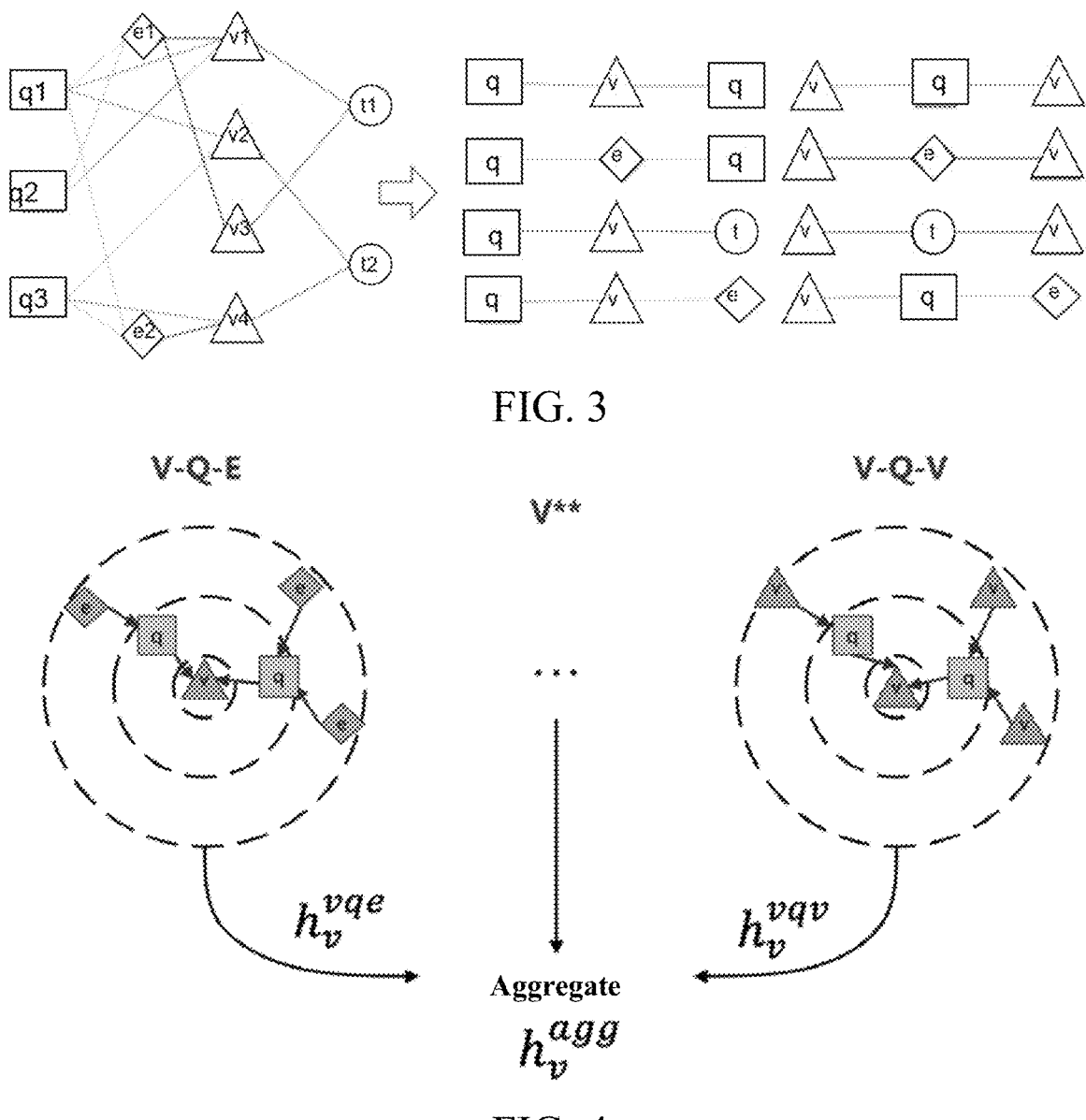
FIG. 3 is a schematic diagram of meta-paths according to an embodiment of this application.
FIG. 4 is a schematic diagram of an obtaining manner of second sample representation information according to an embodiment of this application.

The following describes the technical solutions in embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the scope of the embodiments of this application.

In the specification, claims, and the accompanying drawings in the embodiments of this application, the terms "first," "second," and the like are intended to distinguish between similar objects instead of describing a specific order or sequence. Data termed in such a way are interchangeable in proper circumstances, so that the embodiments of this application described herein can be implemented in orders except the order illustrated or described herein. In addition, the terms "include," "have" and any other variants mean to cover non-exclusive inclusion, for example, a process, method, system, product, or device that includes a series of operations or units is not necessarily limited to those expressly listed operations or units, but may include other operations or units not expressly listed or inherent to such a process, method, system, product, or device.

To make the objectives, technical solutions, and advantages disclosed in the embodiments of this application clearer, the following further describes the embodiments of this application in detail with reference to the accompanying drawings and specific embodiments. The specific embodiments described herein are only used to describe the embodiments of this application, instead of limiting the embodiments of this application.

In the following, the terms "first" and "second" are only configured for the purpose of description and are not to be understood as indicating or implying relative importance or implicitly specifying a quantity of indicated technical features. In view of this, a feature defined by "first" or "second" may explicitly or implicitly include one or more features. In the descriptions of the embodiments of this application, unless otherwise specified, "a plurality of" means two or more. To facilitate understanding of the foregoing technical solutions in the embodiments of this application and the technical effects produced thereby, related technical terms are first explained in the embodiments of this application.

Cloud technology: It is a hosting technology that unifies a series of resources such as hardware, software, and a network in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool, which is used as required, and is flexible and convenient. A back-end service of a technical network system needs a large amount of computing and storage resources, such as a video website, a picture website, and more portal websites. With high development and application of the Internet industry, in the future, each resource may have its own identifier, and needs to be transmitted to a back-end system for logical processing. Data at different levels is processed separately, and data in various industries requires strong system support, which can only be implemented through cloud computing.

An intelligent traffic system (ITS) is also referred to as an intelligent transportation system, and effectively and comprehensively applies advanced science and technologies (an information technology, a computer technology, a data communication technology, a sensor technology, an electronic control technology, an automatic control theory, operations research, artificial intelligence, and the like) to transportation, service control, and vehicle manufacturing, to strengthen a connection between a vehicle, a road, and a user, thereby forming an integrated transportation system for safety assurance, efficiency improvement, environmental enhancement, and energy saving.

Artificial intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, the artificial intelligence is a comprehensive technology in computer science, and attempts to understand the essence of intelligence and produce a new intelligent machine that can react in a manner similar to human intelligence. The artificial intelligence studies design principles and implementation methods of various intelligent machines, to enable the machines to have functions of perception, inference, and decision-making.

Machine learning (ML) is a multi-field interdiscipline, and relates to a plurality of disciplines such as the probability theory, statistics, the approximation theory, convex analysis, and the algorithmic complexity theory. The machine learning specializes in studying how a computer simulates or implements a human learning behavior to obtain new knowledge or skills, and reorganize an existing knowledge structure, to keep improving its performance. The machine learning is a core of the artificial intelligence, is a basic way to make the computer intelligent, and is applied to various fields of the artificial intelligence. Generally, the machine learning and deep learning include technologies such as an artificial neural network, a belief network, reinforcement learning, transfer learning, inductive learning, and learning from demonstrations.

Deep learning: A concept of the deep learning originates from research in artificial neural networks. A multi-layer perceptron including a plurality of hidden layers is one of deep learning structures. During the deep learning, lower-layer features are incorporated into a more abstract higher-layer feature or type, to discover a distributed feature representation of data.

Graph: That is, a graph. The graph includes a group of nodes and edges connecting the nodes, and is configured for expressing a relationship between a plurality of entities. If the nodes in the graph are nodes of different types, the graph is a heterogeneous graph. A type of the node is related to information to which the node points. For example, if there are two types of nodes in a graph, a first type of node represents query information, and a second type of node represents media content, the two types of nodes belong to different types of nodes, and the graph is a heterogeneous graph.

Entity linking: That is, entity linking. The entity linking refers to a process of pointing an identified entity object (for example, a televised IP name or a person name) in free text to a target entity in a knowledge base without ambiguity and correctly.

Meta-path: That is, a meta-path. Simply, the meta-path refers to a specific path mode connecting two entities. For example, a meta-path "video→actor→video" may connect two videos. Therefore, the meta-path may be considered as a way to mine a potential relationship between videos.

Graph neural network: That is, a GNN. The graph neural network is a type of deep learning-based graph domain information processing method, and is configured for learning a connectionist model including a large number of connected graphs.

Retrieval: In the embodiments of this application, the retrieval refers to obtaining several vectors closest to an inputted vector based on the inputted vector.

Offline retrieval: For each query requirement information (query), media content retrieved based on the query requirement information is cached, and in a case that the query requirement information is obtained again, the media content is returned directly based on the cache. This improves a query speed of the media content.

Online retrieval: In the embodiments of this application, in a case that the query requirement information is obtained, retrieval of the media content may be performed based on a constructed media content feature library.

Query-side information: Information obtained based on a query behavior of a user, for example, query information. The query information may be understood as information including a query statement or a query keyword inputted by the user. In this case, the query information is also a type of query requirement information. For a recommendation scenario, the query-side information may be collected by a client or a terminal that provides a recommendation service.

Media-side information: Information related to media content, for example, media information. The media-side information includes content information of the media content or an entity associated with the media content. The entity may be a person name, an institution name, a place name, or another entity identified by a name. For the media content, the entity associated with the media content may be a human name entity, a television work entity, or the like. The human name entity is used as an example. The human name entity may be constructed based on character names of some important characters in the media content. For a television work, the television work entity may be constructed based on a name of the television work.

In the field of media content recommendation, based on the query requirement information inputted by the user (that is, the query information), a media content recommendation model may recommend adapted media content to the user based on the query requirement information, to satisfy a media content query requirement of the user. Generally, the media content recommendation model may perform media content recommendation in a text retrieval manner, in other words, perform word segmentation processing on query requirement information in a text form, perform matching based on a word segmentation processing result and media content in an inverted index, retrieve media content matching the query requirement information based on a matching result, and use a retrieval result as a query result and recommend the query result to the user. In this disclosure, the media content matching the query requirement information is also referred to as "matching media content." An advantage of the text retrieval manner is that the manner is simple. However, because word-by-word matching needs to be performed on segmented keywords, a restriction is excessively strict, leading to a situation in which improper media content is matched while similar words with consistent intentions are inputted.

In view of this, an embodiment of this application provides a media content processing method. In the media content processing method, features that user-side requirement information is clear and knowledge (information) related to media content is rich in a recommendation scenario may be fully utilized to construct a heterogeneous graph based on a query and operating behavior of a user and knowledge information in the field of media content in the recommendation scenario. The heterogeneous graph may represent a relationship between the query behavior of the user and multi-dimensional information related to media content and a relationship between pieces of multi-dimensional information related to the media content. A meta-path is constructed from a plurality of perspectives. In addition, the heterogeneous graph is constructed based on a plurality of types of meta-paths, so that the heterogeneous graph may include rich user-side requirement information and media-side information. By learning graph information of the heterogeneous graph, representation information corresponding to query-side information and representation information corresponding to the media-side information may be mined. The representation information is implicit and different from an explicit keyword obtained through text segmentation, and can represent a feature of query information and a feature of media content when an association exists between the query information and the operated media content, in other words, is not an independent feature but a feature when an association exists between a query and a response.

Further, the representation information obtained through deep mining is stored, so that a media content feature library can be constructed on a server-side. The media content feature library is an implicit feature library, and is different from a feature library obtained through performing only feature extraction on the media content. Therefore, a data storage capability of a server is improved.

For newly inputted query requirement information, media content adapted to the newly inputted query requirement information may be matched based on the media content feature library, and the media content is recommended. Therefore, when responding to a real-time query request, the server may ensure that matched media content is more consistent with a query requirement of a user. In addition, a processing speed of generating a query result is also increased.

FIG. 1 is a schematic diagram of an implementation framework of a media content processing system according to an embodiment of this specification. As shown in FIG. 1, the implementation framework may include at least a client 10 and a server 20. The client 10 and the server 20 communicate through a network 30. The server 20 may be located in a cloud environment. The server 20 is a media content processing node in the cloud environment. The node is any node in the cloud environment.

The server 20 may obtain a first heterogeneous graph by constructing at least one first meta-path, where the first meta-path includes a start information node (also referred to as a "first start information node") representing historical query information and at least one another information node (also referred to as "first other information node") representing media information, the media information includes media content and associated information about the media content, and the media content is media content operated by a user in a query result corresponding to the historical query information; obtain a second heterogeneous graph by constructing at least one second meta-path, where the second meta-path includes a start information node (also referred to as a "second start information node") representing the media content and at least one another information node (also referred to as "second other information node") representing the query information or the associated information; and determine and store, based on the first heterogeneous graph and the second heterogeneous graph, representation information corresponding to each media content, where the representation information is configured for matching media content when target query information is received.

The representation information in the embodiments of this application may be understood as a presentation manner or an information carrier of substantive information. For example, the representation information corresponding to the media content represents substantive information in the media content, and representation information corresponding to the query information refers to substantive information in the query information. In the embodiments of this application, the representation information may be understood as an embedding feature, that is, an embedding feature. The representation information corresponding to the media content is used as an example. The representation information is a vector representation of the media content in low-dimensional space. Different from an explicit feature, an embedding is an implicit representation, and is represented as a multi-dimensional vector that implicitly includes information in the media content.

A media content feature library is constructed based on the representation information corresponding to each media content. Based on the media content feature library, offline retrieval or online retrieval may be performed.

For the online retrieval, in a case that the target query information transmitted by the client 10 is received, information extraction processing is performed on the target query information, to obtain first target representation information corresponding to the target query information; and the media content feature library is queried for second target representation information whose similarity with the first target representation information satisfies a preset requirement, and media content corresponding to the second target representation information is recommended.

In some implementations, a correspondence between the recommended media content and the target query information may further be cached. If the target query information transmitted by the client 10 is received again, media content recommendation may be directly performed based on a cached result. In this way, the offline retrieval is implemented.

The foregoing framework in the embodiments of the present disclosure can provide a media content processing capability required for applications in various scenarios, including but not limited to a cloud technology, cloud gaming, cloud rendering, artificial intelligence, intelligent transportation, assisted driving, video media, a smart community, instant messaging, and the like. Each component in the framework may be a terminal device or a server. The terminal device includes but is not limited to a mobile phone, a computer, an intelligent voice switching device, a smart home appliance, an in-vehicle terminal, and the like.

A media content processing method according to an embodiment of this application is described in the following. FIG. 2 is a schematic flowchart of a media content processing method according to an embodiment of this application. The media content processing method may be performed based on the foregoing server 20. This embodiment of this application provides the method operations described above in an embodiment or a flowchart, but more or fewer operations may be included based on routine or non-creative efforts. A sequence of the operations listed in this embodiment is merely one way of performing a plurality of operations, and does not represent a unique execution sequence. When an actual system, terminal device, or server product performs the operations, the operations may be executed sequentially or in parallel (for example, in a parallel processor or multi-thread processing environment) according to the method shown in the embodiment or the accompanying drawing. The foregoing method may include the following operations.

S201: Obtain a first heterogeneous graph by constructing at least one first meta-path, where the first meta-path includes a start information node representing historical query information and at least one another information node representing media information, the media information includes media content and associated information about the media content, and the media content is media content operated by a user in a query result corresponding to the historical query information.

The media information may be understood as media-side information, and includes the media content, an entity in the media content, a tag associated with the media content, and the like. The associated information about the media content refers to the entity in the media content, the tag associated with the media content, and the like.

For ease of description, in this embodiment of this application, query information is represented as (Query, Q), media content is represented as (Video, V), a preset entity is represented as (Entity, E), and a tag is represented as (Tag, T).

Q-V may have an operation relationship. The operation relationship refers to that the media content V is operated by the user as a query result under a condition that the query information is Q. This operation is a preset operation behavior, such as playing, liking, forwarding, and favorite.

V-E, V-T, Q-E, and Q-T may have a belonging relationship. One piece of media content may have a plurality of entities and a plurality of tags. Because a correspondence may exist between Q and V, and V-E and V-T have a belonging relationship, Q-E and Q-T also have a belonging relationship.

The first meta-path is not limited in the embodiments of this application, provided that the first meta-path uses query information as a start point, and each first meta-path uses an information node corresponding to media-side media information.

In an embodiment, the at least one first meta-path may include at least one of the following meta-paths.

(1) Q-V-Q: A first information node in the first meta-path represents query information (Q), a second information node represents media content (V), and a third information node also represents query information (Q).

Q-V-Q may represent that, based on specific query information, media content operated by the user of the query information may be linked, and then based on the media content, another piece of query information that can also be configured for querying the media content may be linked.

In the embodiments of this application, the media content operated by the user refers to media content receiving a preset operation generated by triggering of a user. In the embodiments of this application, the preset operation is not limited. For example, the preset operation may be a browsing operation, a viewing operation, a liking operation, a comment operation, a favorite operation, a forwarding operation, or the like.

Any media content may be operated by the user under a condition of a plurality of pieces of query information. For any query information, the user may operate a plurality of pieces of media content under a condition of the query information. Certainly, in the embodiments of this application, the media content is not limited, and the media content may be a video, an animation, audio, or the like.

(2) Q-E-Q: A first information node in the first meta-path represents query information (Q), a second information node represents a preset entity (E), and a third information node also represents query information (Q).

Q-E-Q may represent that, based on specific query information, a preset entity related to the query information is linked, and then based on the preset entity, another piece of query information may be linked. The another piece of query information can also be configured for querying for media content related to the preset entity.

Any query information may include a plurality of preset entities, and one preset entity may be linked to a plurality of pieces of query information. The entity is not limited in the embodiments of this application. For example, the entity may be some works or famous characters or images in the works.

(3) Q-V-E: A first information node in the first meta-path represents query information (Q), a second information node represents media content (V), and a third information node is a preset entity (E).

Q-V-E may represent that, based on specific query information, media content related to the query information is linked, and then based on the media content, a preset entity related to the media content is linked.

For any query information, the user may operate a plurality of pieces of media content under a condition of the query information. Any media content may include a plurality of preset entities.

(4) Q-V-T: A first information node in the first meta-path represents query information (Q), a second information node represents media content (V), and a third information node is a tag (T).

Q-V-T may represent that, based on specific query information, media content related to the query information is linked, and then based on the media content, a tag related to the media content is linked.

The tag is not limited in the embodiments of this application. The tag may be configured for classifying the media content based on a content understanding model. The tag represents a class related to the media content, such as history, emotion, and fun.

For any query information, the user may operate a plurality of pieces of media content under a condition of the query information. Any media content may have a plurality of tags, and one tag may also belong to a plurality of pieces of media content.

In Operation S201, a composition operation is performed based on the at least one first meta-path, a plurality of pieces of historical query information, and a plurality of pieces of media information, to obtain the first heterogeneous graph. Specifically, the composition operation is an information filling operation. In other words, based on the at least one first meta-path, the plurality of pieces of historical query information and the plurality of pieces of media information are filled into corresponding information nodes, to obtain specific content of information nodes in the at least one first meta-path. In this case, first target paths respectively corresponding to the at least one first meta-path are obtained. The first target paths may form the first heterogeneous graph.

The first meta-path Q-V-Q is used as an example. For specific historical query information Q1, media content associated with the historical query information Q1 is V1 and V2 respectively, historical query information associated with V1 is Q2, and historical query information associated with V2 is Q3, so that two first target paths, Q1-V1-Q2 and Q1-V2-Q3, may be obtained.

S202: Obtain a second heterogeneous graph by constructing at least one second meta-path, where the second meta-path includes a start information node representing the media content and at least one another information node representing the query information or the associated information.

The second meta-path is not limited in the embodiments of this application, provided that the second meta-path uses media content as a start point. The media content belongs to media-side information, and corresponds to V above. In addition, the second meta-path further includes an information node corresponding to at least one of query information (Q), a media content entity (E), or a media content tag (T).

In an embodiment, the at least one second meta-path may include at least one of the following meta-paths.

(1) V-Q-V: A first information node in the second meta-path represents media content (V), a second information node represents query information (Q), and a third information node also represents media content (V). V-Q-V may represent that, based on specific media content, query information related to the media content is linked, and then based on the query information, other media content that can also be queried for is linked.

Any media content may be operated under a plurality of pieces of query information, and one piece of query information may operate a plurality of pieces of media content.

(2) V-E-V: A first information node in the second meta-path represents media content (V), a second information node represents a preset entity (E), and a third information node also represents media content (V). V-E-V may represent that, based on specific media content, a preset entity related to the media content is linked, and then based on the preset entity, other media content also related to the preset entity is linked.

Any media content may include a plurality of preset entities, and one preset entity may be linked to a plurality of pieces of media content.

(3) V-T-V: A first information node in the second meta-path represents media content (V), a second information node represents a tag (T), and a third information node is media content (V). V-T-V may represent that, based on specific media content, a tag related to the media content is linked, and then based on the tag, other media content related to the tag is linked.

Any media content may include one or more tags, and one tag may belong to a plurality of pieces of media content.

(4) V-Q-E: A first information node in the second meta-path represents media content (V), a second information node represents query information (Q), and a third information node is a preset entity (E). V-Q-E may represent that, based on specific media content, query information related to the media content is linked, and then based on the query information, a preset entity related to the query information is linked.

In Operation S202, a composition operation is performed based on the at least one second meta-path and the plurality of pieces of media information, to obtain the second heterogeneous graph. Specifically, based on the at least one second meta-path, a plurality of pieces of media content, query information, or associated information are filled into corresponding information nodes, to obtain specific content of information nodes in the at least one second meta-path. In this case, second target paths respectively corresponding to the at least one second meta-path are obtained. The second target paths may form the second heterogeneous graph.

For example, the second meta-path V-Q-V is used as an example. For specific media content V1, historical query information associated with V1 is Q2. Based on the historical query information Q2, media content V3 that can also be queried for is linked. In this way, the second target path V1-Q2-V3 is obtained.

FIG. 3 is a schematic diagram of meta-paths. Apparently, the meta-paths may share a specific information node with each other. In other words, the meta-paths are not completely unrelated, but may intersect with each other. In this way, a relationship between various information nodes is more comprehensively represented.

Specifically, as shown on the right side of FIG. 3, the foregoing four first meta-paths and four second meta-paths are included. Lowercase letters in FIG. 3 have the same meaning as corresponding uppercase letters in the foregoing specification.

Based on the foregoing meta-paths, media-side and query-side information may be collected, to construct the first heterogeneous graph and the second heterogeneous graph. Each node in the first heterogeneous graph and the second heterogeneous graph is specific content of an information node in a corresponding meta-path, for example, specific media content, a preset entity, a tag, and query information.

The first heterogeneous graph and the second heterogeneous graph also have information intersection, in other words, the first heterogeneous graph and the second heterogeneous graph may form a general heterogeneous graph.

In some embodiments, a cleaning operation may be performed on the collected media-side and query-side information. The cleaning operation may include at least one of the following content.

(1) Clean Media Content Based on Operation Duration.

The operation duration is duration during which a preset operation is generated for the media content and the preset operation is performed.

The preset operation is not limited in the embodiments of this application, and may be playing, page staying, or the like.

A playing operation is used as an example. For media content associated with specific historical query information, in a case that duration or a proportion of the duration of the media content being played reaches a preset requirement, it is determined that the user is more interested in the media content, a query weight of a corresponding operation is higher, and media content corresponding to an operation with a low query weight may be cleaned.

In the embodiments of this application, a correspondence is established between media content with high operation duration and corresponding historical query information for constructing the foregoing heterogeneous graph.

(2) Clean Historical Query Information Based on a Quantity of Pieces of Media Content.

Specifically, in the embodiments of this application, if a quantity of pieces of media content associated with one piece of historical query information reaches a preset threshold, the historical query information may be retained for constructing the foregoing heterogeneous graph, and other historical query information is cleaned.

(3) Clean a Tag Based on Long Tail Distribution.

Long-tail distributed data is a type of biased distribution, and means that several classes (also referred to as head classes) include a large number of samples, and most classes (also referred to as tail classes) have only a small number of samples. A part is either a head or a tail.

For the tag, the head class that includes the large number of samples has weak directionality, and a tag that is not a head has strong directionality. Directionality refers to a capability of the tag to represent corresponding media content. If there are more pieces of media content associated with the tag, the directionality is weak. If there are fewer pieces of media content associated with the tag, the directionality is strong, and the tag is also referred to as a long-tail tag. In the embodiments of this application, a non-long-tail tag may be deleted, and the long-tail tag is used to construct the foregoing heterogeneous graph.

In some embodiments, some preset entities may alternatively be selected to construct the foregoing heterogeneous graph. For example, only a person name entity, a television work entity, and the like are retained. To control a composition scale, a quality score of the media content may further be used as a threshold, and media content whose quality score greater than the threshold is selected for constructing the foregoing heterogeneous graph.

In some embodiments, media-side and query-side information obtained through the cleaning may be further encoded, and for example, onehot encoding or normalization encoding may be performed. The onehot encoding is a method of encoding N statuses by an N-bit status register. Each status has an independent register bit, and only one of register bits is valid. N is a positive integer greater than 1.

S203: Determine and store, based on the first heterogeneous graph and the second heterogeneous graph, representation information corresponding to each media content, where the representation information is configured for matching media content when target query information is received.

In the embodiments of this application, a media content feature library may be constructed based on the representation information corresponding to the media content, and dense vector retrieval may be performed based on the media content feature library. The dense vector retrieval refers to obtaining several dense vectors closest to an inputted vector based on one dense vector. Each representation information in the media content feature library is a dense vector. Offline retrieval and online retrieval of the media content may be implemented through the dense vector retrieval.

In an embodiment, that the representation information corresponding to each media content is determined based on the first heterogeneous graph and the second heterogeneous graph includes the following operations.

S2041: Train a feature extraction network based on the first heterogeneous graph and the second heterogeneous graph, to obtain a graph feature extraction model.

The feature extraction network is not limited in the embodiments of this application. A GNN may be used, or another network structure with a graph feature extraction capability may be used.

In an embodiment, the feature extraction network may extract information in each information node in the first heterogeneous graph and the second heterogeneous graph by using a graph convolution method, and adjust a parameter of the feature extraction network based on an information extraction result and information about the first heterogeneous graph and the second heterogeneous graph, to obtain the graph feature extraction model.

In the embodiments of this application, the graph convolution method refers to aggregating a feature of an information node and a feature of a neighbor node of the information node based on a topology relationship between information nodes in a graph, to obtain a feature corresponding to the information node. In this way, feature extraction of the information node is completed. Certainly, the aggregating is not limited in the embodiments of this application, and the aggregating may be an operation such as addition or weighted summation.

S2042: Output the representation information after each media content is inputted into the graph feature extraction model.

The graph feature extraction model is obtained by learning relationship information between historical query information and media content related to the historical query information, and learning homogeneity between pieces of representation information obtained for same media content in different meta-paths.

In an embodiment, that the feature extraction network is trained based on the first heterogeneous graph and the second heterogeneous graph, to obtain the graph feature extraction model includes the following operations.

S1: Construct a plurality of positive sample pairs based on a plurality of pieces of historical query information and media content corresponding to each historical query information, and construct a plurality of negative sample pairs based on the plurality of positive sample pairs, where the media content corresponding to the historical query information is media content operated by the user in a query result corresponding to the historical query information.

Several (Q, V) pairs that have a correspondence may be selected as positive sample pairs from the general heterogeneous graph formed by the first heterogeneous graph and the second heterogeneous graph, and a negative sample pair is obtained by replacing V in the positive sample pair with V' in the general heterogeneous graph that does not have a correspondence with Q in the positive sample pair, or by replacing Q in the positive sample pair with Q' in the general heterogeneous graph that does not have a correspondence with V in the positive sample pair.

At a time, batch_size (Q, V) pairs are sampled from the general heterogeneous graph as positive sample pairs, and Q or V in each positive sample pair is replaced to obtain neg_size*batch_size negative samples. batch_size is a quantity of positive sample pairs in each batch in batch training, and neg_size is a preset value.

The following operations S2 and S3 are performed for each sample pair in the plurality of positive sample pairs and each sample pair in the plurality of negative sample pairs.

S2: Respectively extract, based on the first heterogeneous graph and the second heterogeneous graph, a first sub-graph corresponding to historical query information in each sample pair and a second sub-graph corresponding to media content corresponding to the historical query information.

Specifically, it may be considered that the first sub-graph is extracted from the general heterogeneous graph, and includes historical query information and other information extracted along each first meta-path based on the historical query information; and the second sub-graph is extracted from the general heterogeneous graph, and includes media information corresponding to the historical query information and other information extracted along each second meta-path based on the media information corresponding to the historical query information.

S3: Separately input the first sub-graph and the second sub-graph into the feature extraction network to perform graph feature extraction, to obtain first sample representation information corresponding to the historical query information and second sample representation information corresponding to the media content corresponding to the historical query information.

The first sub-graph includes at least two first paths starting from historical query information. The second sub-graph includes at least two second paths starting from media content corresponding to the historical query information. That the first sub-graph and the second sub-graph are separately inputted into the feature extraction network to perform graph feature extraction, to obtain the first sample representation information corresponding to the historical query information and the second sample representation information corresponding to the media content corresponding to the historical query information includes:

separately inputting the first sub-graph and the second sub-graph into the feature extraction network to perform graph feature extraction, to obtain first representation sub-information corresponding to historical query information in each first path, and second representation sub-information corresponding to media content corresponding to historical query information in each second path;

merging pieces of first representation sub-information to obtain the first sample representation information; and merging pieces of second representation sub-information to obtain the second sample representation information.

That the first sub-graph and the second sub-graph are separately inputted into the feature extraction network to perform graph feature extraction, to obtain the first representation sub-information corresponding to the historical query information in each first path, and the second representation sub-information corresponding to the media content corresponding to the historical query information in each second path includes:

performing graph feature extraction and aggregation on information in the first path for each first path in a direction from an end point to a start point, to obtain the first representation sub-information corresponding to the first path; and performing graph feature extraction and aggregation on information in the second path for each second path in a direction from an end point to a start point, to obtain the second representation sub-information corresponding to the second path.

An obtaining manner of the first sample representation information is the same as an obtaining manner of the second sample representation information. This embodiment of this application is described in detail from a perspective of the obtaining manner of the second sample representation information.

In an embodiment, specific media content V is used as a center, and there are four second meta-paths, including: V-Q-V, V-T-V, V-E-V, and V-Q-E. FIG. 4 is a schematic diagram of the obtaining manner of the second sample representation information. Graph feature extraction is separately performed, based on the four second meta-paths, on a second sub-graph associated with the specific media content V. Specifically, graph convolution may be used. In some embodiments, a graph convolution operator refers to an operator with a neighbor aggregation function, such as GraphSage. GraphSage is a spatial domain-based algorithm, and improves a conventional graph convolutional network in two aspects:

First, the conventional graph convolutional network is improved during training. A sampling manner is changed from performing entire graph sampling to performing partial node-centered neighbor sampling on the graph convolutional network. This makes distributed training of large-scale graph data possible, and enables the network to learn an unseen node. This further enables inductive learning by using GraphSage.

Second, by using GraphSage, several modes of neighbor aggregation are studied, and advantages and disadvantages of different aggregation modes are compared through an experiment and theoretical analysis.

Information processing manners of the second meta-paths are the same. The second meta-path V-Q-E is used as an example. It is assumed that several neighbors Q with direct correlations are sampled for each V, and several E with direct correlations are sampled for each Q, to obtain a target sub-graph corresponding to the second meta-path. Then, at a first layer of the target sub-graph, information he_0 of each E node is first aggregated to information hq_0 of each corresponding node Q to obtain hq_1. At a second layer, information hq_1 of each node that have been aggregated once is then aggregated to information hv_0 of a node V to obtain hv_2. In this way, second representation sub-information $$h_v^{vqe}$$

is obtained.

The four second meta-paths may be considered as representing four perspectives for information extraction of the media content V respectively. Second representation sub-information obtained for the media content V at each perspective may be aggregated (that is, merged), to obtain second sample representation information of the media content V. Through multi-perspective aggregation, information included in the second sample representation information is more comprehensive, and information concentration of the information in the second sample representation information is increased.

Specifically, after second representation sub-information respectively corresponding to the four second meta-paths is obtained, pieces of second representation sub-information may be aggregated, and then normalized after aggregation, to obtain final second sample representation information corresponding to the media content V.

An aggregation method is not limited in embodiments of this application. In some embodiments, the aggregation method may be averaging. Specifically, pieces of second representation sub-information may be added and averaged to obtain an aggregation result, or may be aggregated by using an attention mechanism. The attention mechanism may introduce more attention to some pieces of second representation sub-information in an aggregation process, or weaken some pieces of second representation sub-information.

In some implementations, aggregation may alternatively be performed by using a mask mechanism. The mask mechanism is a mask mechanism, and is defined as a method for masking some elements. Specifically, an aggregation result may be obtained by using a specific probability to hide a part of aggregated information. A model trained based on the aggregation result may not depend much on some local features, so that the model is more generalized. In this way, robustness of the model is enhanced. The robustness may be used to measure stability of the model, and indicates a capability of the model to maintain an output result stable in an abnormal or special case.

In this embodiment of this application, second representation sub-information $$h_v^{vqe}$$

and $$h_v^{vqv}$$

respectively corresponding to two second meta-paths are used as an example. Aggregation is performed on the two pieces of second representation sub-information to obtain second sample representation information $$h_v^{agg}$$

shown in FIG. 4.

S4: Adjust the parameter of the feature extraction network based on a first loss, to obtain the graph feature extraction model, where the first loss is configured for guiding the feature extraction network to enhance a correlation between first sample representation information and second sample representation information in the positive sample pair and reduce a correlation between first sample representation information and second sample representation information in the negative sample pair.

In the embodiments of this application, the parameter of the feature extraction network may be understood as a parameter required for the graph feature extraction on the foregoing first sub-graph and the foregoing second sub-graph. In the embodiments of this application, the foregoing parameter may be adjusted based on a gradient descent method. The gradient descent method is a method of first-order optimization adjustment of a network parameter through gradient descent.

In the embodiments of this application, the gradient descent method may guide the foregoing parameter to be adjusted in a direction of reducing the first loss. By reducing the first loss, objectives of enhancing the correlation between the first sample representation information and the second sample representation information in the positive sample pair and reducing the correlation between the first sample representation information and the second sample representation information in the negative sample pair may be achieved.

The first loss may be understood as a Bayesian personalized ranking loss, that is a BPR loss, and is a widely used classical loss for learning inter-feature relationship information based on positive and negative sample pairs. An idea of the BPR loss is to maximize a difference between a positive sample and a negative sample learned by the model.

In this embodiment of this application, by reducing the first loss, the correlation between the first sample representation information and the second sample representation information in the positive sample pair may be maximized, and the correlation between the first sample representation information and the second sample representation information in the negative sample pair may be minimized.

In some embodiments, that the parameter of the feature extraction network is adjusted based on the first loss, to obtain the graph feature extraction model includes: adjusting the parameter of the feature extraction network based on the first loss and a second loss, to obtain the graph feature extraction model, where the second loss is configured for guiding the feature extraction network to enhance a correlation between pieces of second representation sub-information corresponding to same media content and reduce a correlation between pieces of second representation sub-information corresponding to different media content.

The pieces of second representation sub-information corresponding to the same media content may be understood as pieces of representation sub-information learned from different perspectives for the same media content. The pieces of representation sub-information learned from the different perspectives are actually expressions of the same media content. Therefore, essentially, there is to be strong correlation between the pieces of second representation sub-information. The parameter of the feature extraction network may be adjusted by reducing the second loss, to guide the foregoing feature extraction network to enhance the correlation between the pieces of second representation sub-information corresponding to the same media content and reduce the correlation between the pieces of second representation sub-information corresponding to the different media content. In this way, contrastive learning of the pieces of representation sub-information from various perspectives is implemented. Therefore, the second loss may also be considered as a contrastive learning loss.

In some embodiments, the second loss is further configured for guiding the feature extraction network to enhance a correlation between pieces of first representation sub-information corresponding to same historical query information and reduce a correlation between pieces of first representation sub-information corresponding to different historical query information.

A specific principle of guiding, based on the second loss, the feature extraction network to enhance the correlation between the pieces of second representation sub-information corresponding to the same media content and reduce the correlation between the pieces of second representation sub-information corresponding to the different media content is the same as a specific principle of guiding, based on the second loss, the feature extraction network to enhance the correlation between the pieces of first representation sub-information corresponding to the same historical query information and reduce the correlation between the pieces of first representation sub-information corresponding to the different historical query information. The former is used as an example for detailed descriptions.

Figure 5:
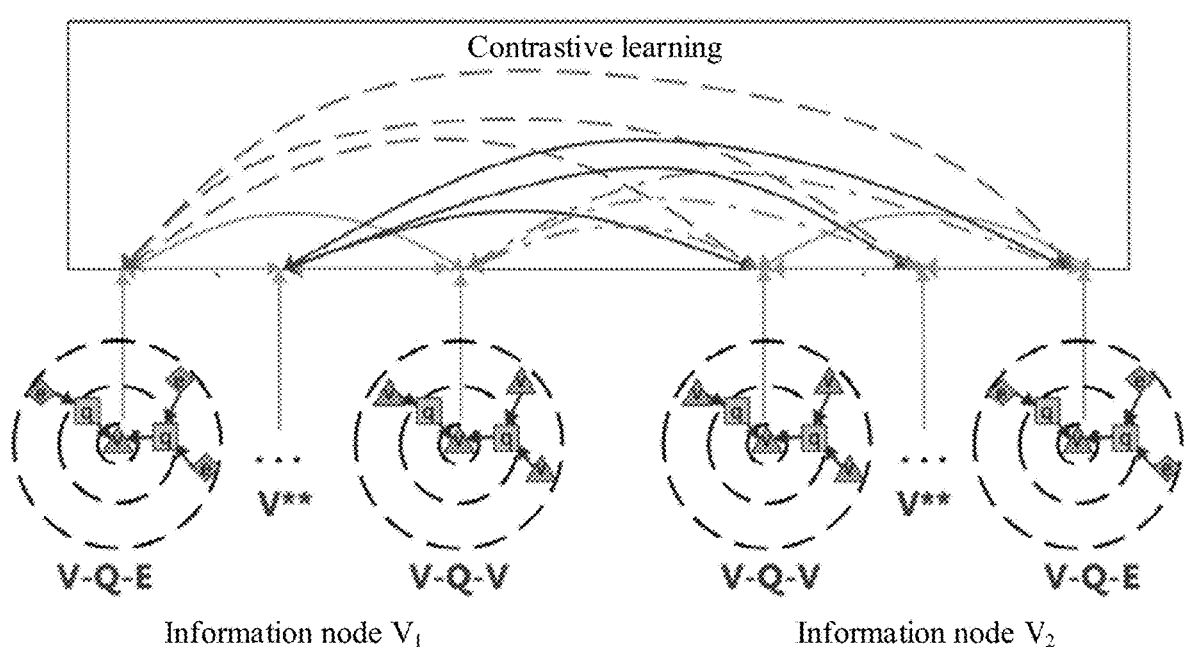
FIG. 5 is a schematic diagram of an information relationship used by a second loss for measuring according to an embodiment of this application.

FIG. 5 is a schematic diagram of an information relationship used by a second loss for measuring. An example in which second sample representation information of media content is obtained by aggregating information on four second meta-paths is used. Same media content may include four pieces of second representation sub-information. Although the four pieces of second representation sub-information are from the four different second meta-paths, the four pieces of second representation sub-information are representations of the same media content. Therefore, the four pieces of second representation sub-information are expected to be homogenous. Based on the principle, contrastive learning is performed, and the second loss is designed.

Two of pieces of second representation sub-information of same media content are positive examples of each other. Two of pieces of second representation sub-information of different media content V in a same batch are negative examples of each other. A correlation between the pieces of second representation sub-information of the positive example is represented by using the following formula.

$$z_{ni,nj} \frac{(h_{ni})^T \cdot h_{nj}}{\|h_{ni}\|\|h_{nj}\|} \qquad (1)$$

$h_{ni}$ and $h_{nj}$ respectively represent $i^{th}$ second representation sub-information and $j^{th}$ second representation sub-information of $n^{th}$ media content in the batch. The second loss determined based on the pieces of second representation sub-information of the same media content may include:

$$l_{cl} = -\log \frac{e^{z_{ni,nj}/\tau}}{\sum_{n'=1,n'\neq n}^{N} e^{z_{ni,n'j}/\tau}} \qquad (2)$$

n represents an $n^{th}$ sample in a batch with a total of N samples. i, and j represent two different second meta-paths. n' is a number of other media content that is different from the media content corresponding to n and that is in the same batch. $\tau$ is a temperature coefficient, and is an adjustable constant.

After a graph feature extraction model is trained, representation information corresponding to each media content in a media content library may be obtained based on the graph feature extraction model, and a media content feature library may be constructed based on the representation information corresponding to each media content. When target query information is received, information extraction processing is performed on the target query information, to obtain first target representation information corresponding to the target query information. The media content feature library is queried based on the first target representation information, and media content matching the target query information is determined based on a query result.

Specifically, the media content feature library is queried based on the first target representation information to obtain at least one piece of second target representation information, where a correlation between the second target representation information and the first target representation information satisfies a preset requirement. Media content corresponding to each second target representation information is determined as the media content matching the target query information.

The target query information may be a type of query requirement information inputted by a user, and media content queried for based on the target query information is media content of interest to the user, for example, short video content of interest to the user.

In some scenarios, it may be difficult to obtain a good retrieval result through once retrieval. In this case, a plurality of times of retrieval may be used. For example, media content 1 may be retrieved according to the technical solutions in embodiments of this application, media content 2 may be retrieved based on a past interest of the user, and media content 3 may be retrieved based on a recent topic. Pieces of media content obtained through the plurality of times of retrieval are jointly used as a retrieval result, or jointly used as input information for further screening, and a final retrieval result is obtained through still further screening.

In some implementations, similar media content may alternatively be retrieved based on the media content feature library. For example, specific media content is inputted, and several other pieces of media content similar to the inputted media content may be retrieved based on the media content feature library.

In some embodiments, coarse or fine sorting of media content may further be performed. Generally, the coarse sorting may refer to sorting N1 pieces of media content, and selecting N2 pieces of top-ranking media content as an input for the fine sorting. In the fine sorting, the inputted N2 pieces of media content may further be re-sorted, and N3 pieces of top-ranking media content are selected for final output, where N1 is greater than N2, and N2 is greater than N3. Different sorting methods may be configured for the coarse sorting and the fine sorting. This is not limited in the embodiments of this application. Certainly, in some embodiments, outputting may be performed after only the coarse sorting.

Figure 6:
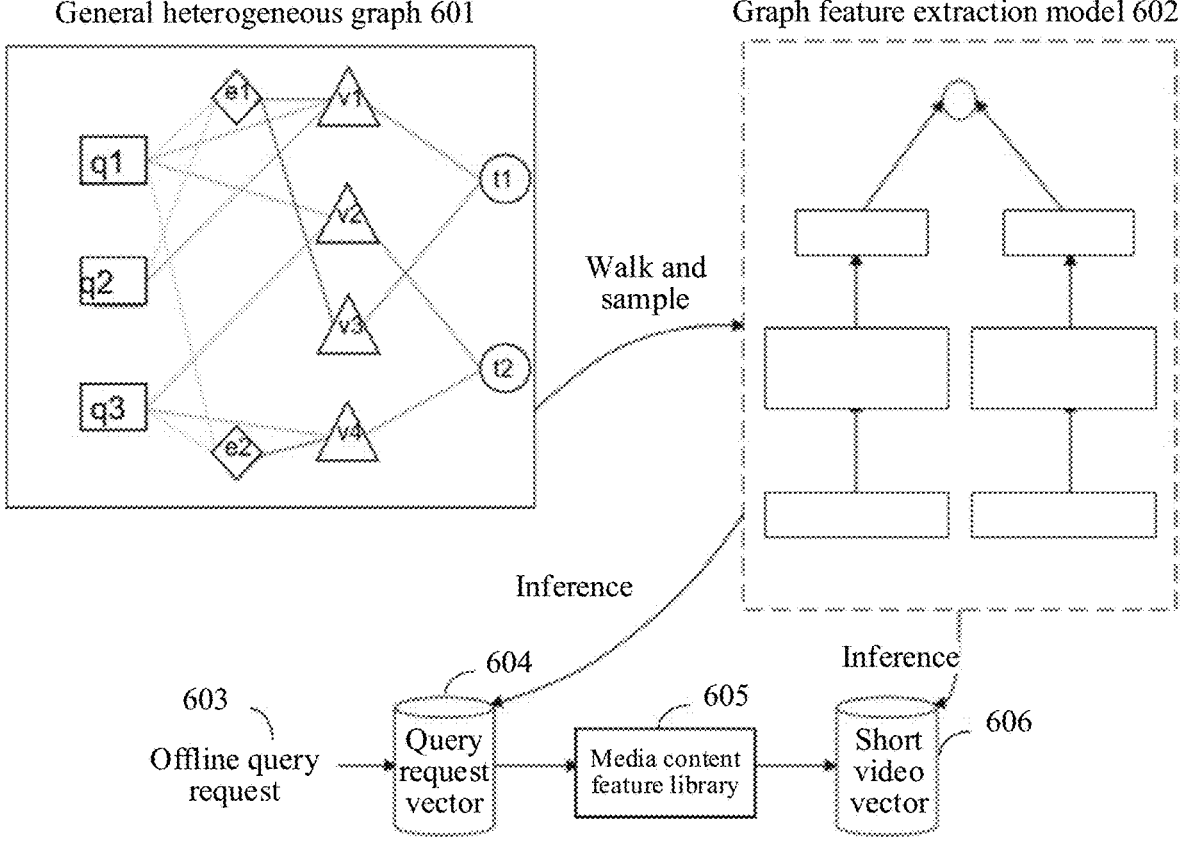
FIG. 6 is a schematic diagram of recommending based on representation information of each media content according to an embodiment of this application.

FIG. 6 is a schematic diagram of recommending based on representation information of each media content. According to large-scale composition, a first heterogeneous graph and a second heterogeneous graph are obtained, and a general heterogeneous graph 601 is obtained based on the first heterogeneous graph and the second heterogeneous graph. Then, the general heterogeneous graph 601 is walked and sampled, and is trained based on a sampling result to obtain a graph feature extraction model 602. Then, feature extraction (also referred to as inference) is performed on newly inputted target query information (namely, an offline query request 603) by using the graph feature extraction model 602 to obtain first target representation information (namely, a query request vector 604), and a media content feature library 605 is queried based on the query request vector 604 to obtain at least one piece of second target representation information (namely, a short video vector 606). A correlation between the short video vector 606 and the query request vector 604 satisfies a preset requirement. Media content corresponding to each short video vector 606 is recommended.

The preset requirement is not limited in this embodiment of this application. For example, embeddings in the media content feature library may be sorted in descending order of correlations with the query request vector 604, and several top embeddings are short video vectors 606. For another example, an embedding whose correlation with the query request vector 604 is greater than a preset threshold may be determined as a short video vectors 606. The preset threshold may be limited based on an actual situation. This is not limited in the embodiments of this application.

In an embodiment, both the first target representation information and the second target representation information are 64-dimensional embeddings. A vector index may be established for the embeddings in the media content feature library to achieve an acceleration effect. The vector index may be common Faiss.

In a specific embodiment, the acceleration effect may be achieved based on an approximate nearest neighbor (ANN) vector retrieval engine. Each representation information in the media content feature library is a vector, and vector retrieval is to retrieve, in a given vector dataset according to a measuring manner, K vectors (K-Nearest Neighbors, KNNs) similar to an inputted vector. The ANN vector retrieval engine is a tool that provides ANN vector retrieval.

In a media content query scenario, relying on query and retrieval based on text information only often ignores a real need on a user-side. In the media content processing method in embodiments of this application, in combination with behavior information of a user querying and operating media content, knowledge is constructed on both a query-side (a Query-side) and a media content-side (a Video-side), composition is performed based on entity linking information, and multi-perspective contrastive learning on a graph is used to construct a plurality of types of meta-paths, so that deeper query representation and media content representation are learned, and a media content result that is more accurate and that satisfies a depth requirement of the user is provided for querying by the user.

In the media content processing method, features that user-side requirement information is clear and knowledge related to media content-side media content is rich in a recommendation scenario may be fully utilized to construct a heterogeneous graph based on a query and operating behavior of the user and knowledge information in the field of media content in the recommendation scenario. The heterogeneous graph may represent a relationship between the query behavior of the user and multi-dimensional information related to media content and a relationship between pieces of multi-dimensional information related to the media content. A meta-path is constructed from a plurality of perspectives. In addition, the heterogeneous graph is constructed based on a plurality of types of meta-paths, so that the heterogeneous graph may include rich user-side requirement information and media-side information. By learning graph information of the heterogeneous graph, representation information corresponding to query-side information and representation information corresponding to media-side information may be mined, to construct the media content feature library. For newly inputted query requirement information, media content adapted the newly inputted query requirement information may be retrieved based on the media content feature library, and the media content is recommended.

Figure 7:
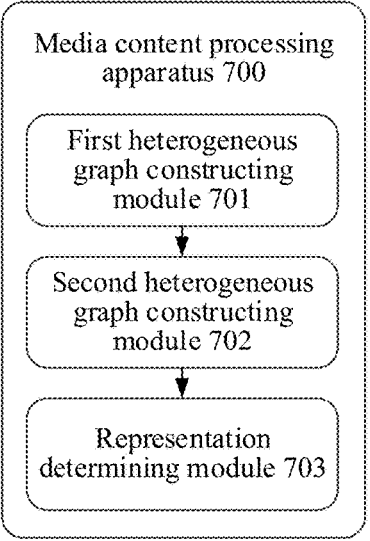
FIG. 7 is a block diagram of a media content processing apparatus according to an embodiment of this application.

FIG. 7 is a block diagram of a media content processing apparatus 700 according to this embodiment. The apparatus 700 includes:

a first heterogeneous graph constructing module 701, configured to obtain a first heterogeneous graph by constructing at least one first meta-path, where the first meta-path includes a start information node representing historical query information and at least one another information node representing media information, the media information includes media content and associated information about the media content, and the media content is media content operated by a user in a query result corresponding to the historical query information;

a second heterogeneous graph constructing module 702, configured to obtain a second heterogeneous graph by constructing at least one second meta-path, where the second meta-path includes a start information node representing the media content and at least one another information node representing the query information or the associated information; and a representation determining module 703, configured to determine and store, based on the first heterogeneous graph and the second heterogeneous graph, representation information corresponding to each media content, where the representation information is configured for matching media content when target query information is received.

In an embodiment, the apparatus further includes a matching module. The matching module is configured to perform the following operations:

constructing a media content feature library based on the representation information corresponding to each media content;

performing, when the target query information is received, information extraction processing on the target query information, to obtain first target representation information corresponding to the target query information; and querying the media content feature library based on the first target representation information, and determining, based on a query result, media content matching the target query information.

In an embodiment, the matching module is configured to perform the following operations:

querying the media content feature library based on the first target representation information to obtain at least one piece of second target representation information, where a correlation between the second target representation information and the first target representation information satisfies a preset requirement; and determining media content corresponding to each second target representation information as the media content matching the target query information.

In an embodiment, the foregoing representation determining module 703 is configured to perform the following operations:

training a feature extraction network based on the first heterogeneous graph and the second heterogeneous graph, to obtain a graph feature extraction model; and outputting the representation information after each media content is inputted into the graph feature extraction model.

In an embodiment, the foregoing representation determining module 703 is configured to: perform the following operations:

constructing a plurality of positive sample pairs based on a plurality of pieces of historical query information and media content corresponding to each historical query information, and constructing a plurality of negative sample pairs based on the plurality of positive sample pairs, where the media content corresponding to the historical query information is media content operated by the user in a query result corresponding to the historical query information; and perform the following processing for each sample pair in the plurality of positive sample pairs and each sample pair in the plurality of negative sample pairs:

respectively extracting, based on the first heterogeneous graph and the second heterogeneous graph, a first sub-graph corresponding to historical query information in each sample pair and a second sub-graph corresponding to media content corresponding to the historical query information;

separately inputting the first sub-graph and the second sub-graph into the feature extraction network to perform graph feature extraction, to obtain first sample representation information corresponding to the historical query information and second sample representation information corresponding to the media content corresponding to the historical query information; and adjusting a parameter of the feature extraction network based on a first loss, to obtain the graph feature extraction model, where the first loss is configured for guiding the feature extraction network to enhance a correlation between first sample representation information and second sample representation information in the positive sample pair and reduce a correlation between first sample representation information and second sample representation information in the negative sample pair.

In an embodiment, the first sub-graph includes at least two first paths starting from historical query information, and the second sub-graph includes at least two second paths starting from media content corresponding to the historical query information. The representation determining module 703 is configured to perform the following operations:

separately inputting the first sub-graph and the second sub-graph into the feature extraction network to perform graph feature extraction, to obtain first representation sub-information corresponding to historical query information in each first path, and second representation sub-information corresponding to media content corresponding to historical query information in each second path;

merging pieces of first representation sub-information to obtain the first sample representation information; and merging pieces of second representation sub-information to obtain the second sample representation information.

In an embodiment, the foregoing representation determining module 703 is configured to perform the following operations:

adjusting the parameter of the feature extraction network based on the first loss and a second loss, to obtain the graph feature extraction model, where the second loss is configured for guiding the feature extraction network to enhance a correlation between pieces of second representation sub-information corresponding to same media content and reduce a correlation between pieces of second representation sub-information corresponding to different media content.

In an embodiment, the second loss is further configured for guiding the feature extraction network to enhance a correlation between pieces of first representation sub-information corresponding to same historical query information and reduce a correlation between pieces of first representation sub-information corresponding to different historical query information.

In an embodiment, the foregoing representation determining module 703 is configured to perform the following operations:

performing graph feature extraction and aggregation on information in the first path for each first path in a direction from an end point to a start point, to obtain the first representation sub-information corresponding to the first path; and performing graph feature extraction and aggregation on information in the second path for each second path in a direction from an end point to a start point, to obtain the second representation sub-information corresponding to the second path.

The apparatus and the method embodiments in embodiments of this application are based on a same inventive concept. Details are not described herein again.

Figure 8:
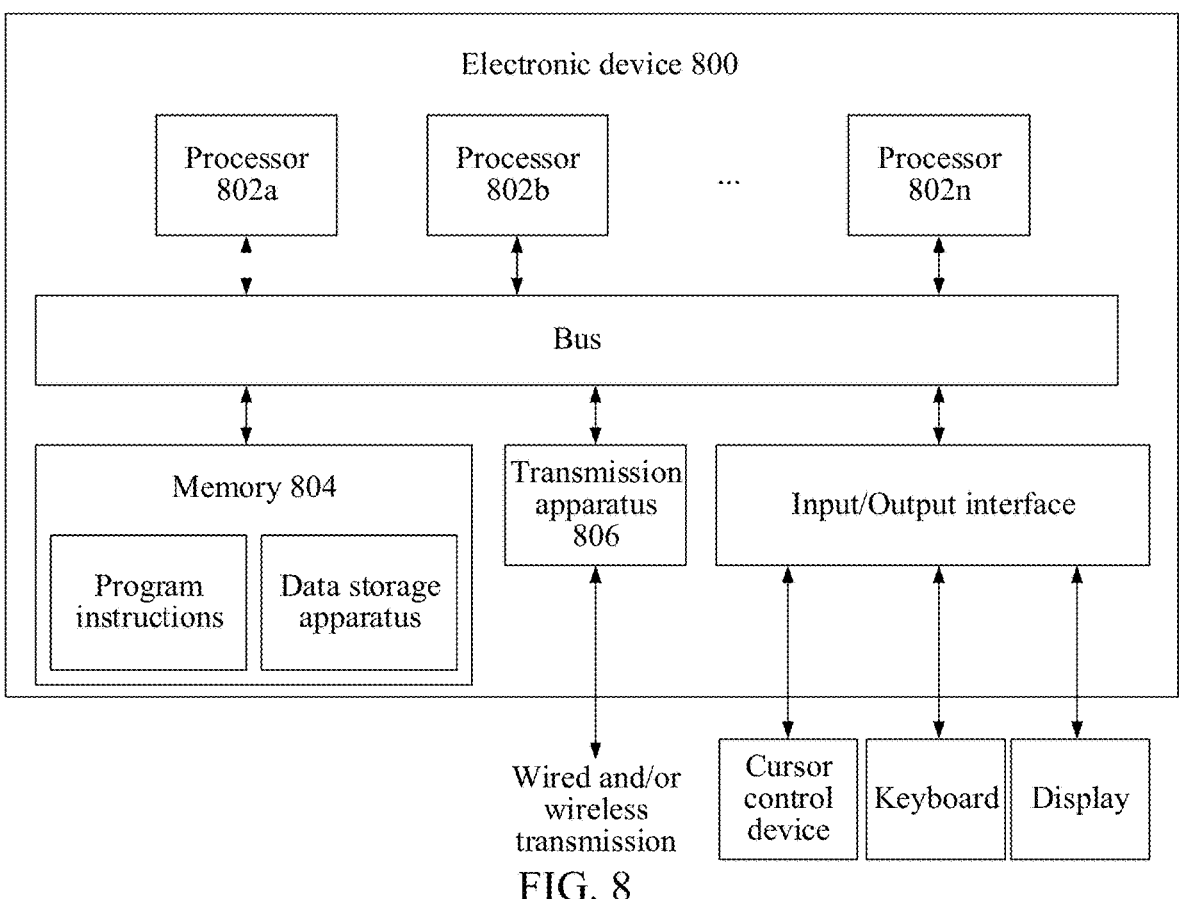
FIG. 8 is a schematic diagram of a hardware structure of an electronic device configured to implement the method according to embodiments of this application according to an embodiment of this application.

Further, FIG. 8 is a schematic diagram of a hardware structure of an electronic device configured to implement the method according to embodiments of this application. The electronic device may involve in forming or including the apparatus or system according to the embodiments of this application, for example, the server 20 in FIG. 1.

As shown in FIG. 8, the electronic device 800 may include one or more (shown by 802*a*, 802*b*, . . . , and 802*n* in the figure) processors 802 (the processor 802 may include but is not limited to a processing apparatus such as a microprocessor MCU or a programmable logic device FPGA), a memory 804 configured to store data, and a transmission apparatus 806 configured for a communication function. In addition, the electronic device may further include: a display, an input/output interface (I/O interface), a universal serial bus (USB) port (which may be included as one of ports of the I/O interface), a network interface, a power supply, and/or a camera.

A person of ordinary skill in the art may understand that the structure shown in FIG. 8 is only for the purpose of illustration, and does not cause a limitation to the structure of the foregoing electronic device. For example, the electronic device 800 may further include more or fewer components than those shown in FIG. 8 or have a configuration different from that shown in FIG. 8.

Generally, the one or more processors 802 and/or other data processing circuits may be referred to as "data processing circuits" herein. All or some of the data processing circuits may be implemented as software, hardware, firmware, or any combination thereof. In addition, the data processing circuit may be a single independent processing module, or all or some of the data processing circuits may be incorporated into any another element in the electronic device 800 (or a mobile device). As described in the embodiments of this application, the data processing circuit is used as a type of processor control (for example, selection of a variable resistance termination path connected to an interface).

The memory 804 may be configured to store a software program of application software and a module, for example, program instructions/data storage apparatus corresponding to the method according to the embodiments of this application, and the processor 802 runs the software program and the module stored in the memory 804, to perform various functional applications and data processing, that is, implement the foregoing media content processing method. The memory 804 may include a high speed random access memory, and may further include a non-volatile memory, for example, one or more magnetic storage apparatuses, a flash memory, or another non-volatile solid-state memory. In some instances, the memory 804 may further include memories remotely disposed relative to the processor 802, and these remote memories may be connected to the electronic device 800 through a network. Instances of the network include, but are not limited to, an internet, an intranet, a local area network, a mobile communication network, and a combination thereof.

The transmission apparatus 806 is configured to receive or send data through a network. A specific instance of the network may include a wireless network provided by a communication provider of the electronic device 800. In an instance, the transmission apparatus 806 includes a network interface controller (NIC) that may be connected to another network device through a base station to communicate with the internet. In an instance, the transmission apparatus 806 may be a radio frequency (RF) module that is configured to communicate with the internet in a wireless manner.

The display may be, for example, a touch-screen liquid crystal display (LCD). The liquid crystal display may enable a user to exchange with a user interface of the electronic device 800 (or the mobile device).

A sequence of the foregoing embodiments of this application is merely for description purpose, and does not indicate the preference of the embodiments. In addition, the foregoing describes specific embodiments in the embodiments of this application. Other embodiments are within the scope of the following claims. In some cases, the actions or operations described in the claims may be performed in an order different from that in the embodiments and still achieve an expected result. In addition, the processes depicted in the accompanying drawings do not necessarily require the particular order shown or the consecutive order to achieve a desirable result. In some implementations, multitask processing and parallel processing may also be or may be advantageous.

Embodiments of this application are all described in a progressive manner, for same or similar parts in the embodiments, refer to each other, and descriptions of each embodiment focus on a difference from another embodiment. In particular, the apparatus and server embodiment is basically similar to the method embodiment, and therefore is described briefly. For a related part, refer to the part of the descriptions in the method embodiment.

A person of ordinary skill in the art may understand that all or some of the operations of the foregoing embodiments may be implemented by hardware, or may be implemented by a program instructing related hardware. The program may be stored in a computer-readable storage medium. The storage medium mentioned above may be a read-only memory, a magnetic disk, an optical disc, or the like. Instructions in the storage medium may perform any media content processing method in the embodiments of this application.

The foregoing descriptions are merely exemplary embodiments of the embodiments of this application, but are not intended to limit the embodiments of this application. Any modification, equivalent replacement, or improvement made within the spirit and principle of the embodiments of this application shall fall within the protection scope of the embodiments of this application.

What is claimed is:

1. A media content processing method, performed by an electronic device, comprising:

obtaining a first heterogeneous graph, including constructing a first meta-path, the first meta-path including a first start information node representing historical query information and at least one first other information node representing media information, the media information including one media content and associated information about the media content, and the media content being in a query result corresponding to the historical query information and being operated by a user;

obtaining a second heterogeneous graph, including constructing a second meta-path, the second meta-path including a second start information node representing the media content and at least one second other information node representing the query information or the associated information;

training a feature extraction network based on the first heterogeneous graph and the second heterogeneous graph, to obtain a graph feature extraction model, comprising:

constructing a plurality of positive sample pairs and negative sample pairs based on a plurality of pieces of historical query information and media content corresponding to each of the plurality of pieces of historical query information;

for each sample pair in the plurality of positive sample pairs and the plurality of negative sample pairs, performing:

extracting, based on the first heterogeneous graph and the second heterogeneous graph, respectively, a first sub-graph corresponding to historical query information in the sample pair and a second sub-graph corresponding to media content corresponding to the historical query information; and separately inputting the first sub-graph and the second sub-graph into the feature extraction network to perform graph feature extraction, to obtain first sample representation information corresponding to the historical query information and second sample representation information corresponding to the media content corresponding to the historical query information; and adjusting a parameter of the feature extraction network based on a loss, to obtain the graph feature extraction model, the loss being configured to guide the feature extraction network to enhance a correlation between first sample representation information and second sample representation information in each of the positive sample pairs and reduce a correlation between first sample representation information and second sample representation information in each of the negative sample pairs; and inputting the media content into the graph feature extraction model to obtain representation information corresponding to the media content.

2. The method according to claim 1, further comprising:

constructing a media content feature library based at least on the representation information;

performing, in response to receiving target query information, information extraction processing on the target query information, to obtain target representation information corresponding to the target query information; and querying the media content feature library based on the target representation information, and determining, based on a query result, matching media content that matches the target query information.

3. The method according to claim 2, wherein:

the target representation information is first target representation information; and querying the media content feature library and determining the matching media content includes:

querying the media content feature library based on the first target representation information to obtain at least one piece of second target representation information, a correlation between each of the at least one piece of second target representation information and the first target representation information satisfying a preset requirement; and determining media content corresponding to each of the at least one piece of second target representation information as at least part of the matching media content.

4. The method according to claim 1, wherein:

the media content corresponding to one piece of historical query information in the plurality of pieces of historical query information is in a query result corresponding to the one piece of historical query information and is operated by the user.

5. The method according to claim 1, wherein:

the first sub-graph includes at least two first paths starting from historical query information, and the second sub-graph includes at least two second paths starting from media content corresponding to historical query information; and separately inputting the first sub-graph and the second sub-graph into the feature extraction network to perform graph feature extraction includes:

separately inputting the first sub-graph and the second sub-graph into the feature extraction network to perform graph feature extraction, to obtain at least two pieces of first representation sub-information each corresponding to historical query information in one of the at least two first paths, and at least two pieces of second representation sub-information each corresponding to media content corresponding to historical query information in one of the at least two second paths;

merging the at least two pieces of first representation sub-information to obtain the first sample representation information; and merging the at least two pieces of second representation sub-information to obtain the second sample representation information.

6. The method according to claim 5, wherein:

the loss is a first loss;

adjusting the parameter of the feature extraction network includes:

adjusting the parameter of the feature extraction network based on the first loss and a second loss, to obtain the graph feature extraction model; and the second loss is configured to guide the feature extraction network to enhance a correlation between various pieces of second representation sub-information corresponding to same media content and reduce a correlation between various pieces of second representation sub-information corresponding to different media content.

7. The method according to claim 6, wherein the second loss is further configured to guide the feature extraction network to enhance a correlation between various pieces of first representation sub-information corresponding to same historical query information and reduce a correlation between various pieces of first representation sub-information corresponding to different historical query information.

8. The method according to claim 6, wherein separately inputting the first sub-graph and the second sub-graph into the feature extraction network to perform graph feature extraction, to obtain the at least two pieces of first representation sub-information and the at least two pieces of second representation sub-information includes:

for each first path of the at least two first paths, performing graph feature extraction and aggregation on information in the first path in a direction from an end point to a start point, to obtain the first representation sub-information corresponding to the first path; and for each second path of the at least two second paths, performing graph feature extraction and aggregation on information in the second path in a direction from an end point to a start point, to obtain the second representation sub-information corresponding to the second path.

9. An electronic device comprising:

at least one memory storing one or more instructions; and at least one processor communicatively connected to the at least one memory and configured to execute the one or more instructions to:

obtain a first heterogeneous graph, including constructing a first meta-path, the first meta-path including a first start information node representing historical query information and at least one first other information node representing media information, the media information including one media content and associated information about the media content, and the media content being in a query result corresponding to the historical query information and being operated by a user;

obtain a second heterogeneous graph, including constructing a second meta-path, the second meta-path including a second start information node representing the media content and at least one second other information node representing the query information or the associated information;

train a feature extraction network, based on the first heterogeneous graph and the second heterogeneous graph, to obtain a graph feature extraction model, comprising:

constructing a plurality of positive sample pairs and negative sample pairs based on a plurality of pieces of historical query information and media content corresponding to each of the plurality of pieces of historical query information;

for each sample pair in the plurality of positive sample pairs and the plurality of negative sample pairs, performing:

extracting, based on the first heterogeneous graph and the second heterogeneous graph, respectively, a first sub-graph corresponding to historical query information in the sample pair and a second sub-graph corresponding to media content corresponding to the historical query information; and separately inputting the first sub-graph and the second sub-graph into the feature extraction network to perform graph feature extraction, to obtain first sample representation information corresponding to the historical query information and second sample representation information corresponding to the media content corresponding to the historical query information; and adjusting a parameter of the feature extraction network based on a loss, to obtain the graph feature extraction model, the loss being configured to guide the feature extraction network to enhance a correlation between first sample representation information and second sample representation information in each of the positive sample pairs and reduce a correlation between first sample representation information and second sample representation information in each of the negative sample pairs; and input the media content into the graph feature extraction model to obtain representation information corresponding to the media content.

10. The electronic device according to claim 9, wherein the at least one processor is further configured to execute the one or more instructions to:

construct a media content feature library based at least on the representation information;

perform, in response to receiving target query information, information extraction processing on the target query information, to obtain target representation information corresponding to the target query information; and query the media content feature library based on the target representation information, and determining, based on a query result, matching media content that matches the target query information.

11. The electronic device according to claim 10, wherein:

the target representation information is first target representation information; and the at least one processor is further configured to execute the one or more instructions to, when querying the media content feature library and determining the matching media content:

query the media content feature library based on the first target representation information to obtain at least one piece of second target representation information, a correlation between each of the at least one piece of second target representation information and the first target representation information satisfying a preset requirement; and determine media content corresponding to each of the at least one piece of second target representation information as at least part of the matching media content.

12. The electronic device according to claim 9, wherein:

the media content corresponding to one piece of historical query information in the plurality of pieces of historical query information is in a query result corresponding to the one piece of historical query information and is operated by the user.

13. The electronic device according to claim 12, wherein:

the first sub-graph includes at least two first paths starting from historical query information, and the second sub-graph includes at least two second paths starting from media content corresponding to historical query information; and the at least one processor is further configured to execute the one or more instructions to, when separately inputting the first sub-graph and the second sub-graph into the feature extraction network to perform graph feature extraction:

separately input the first sub-graph and the second sub-graph into the feature extraction network to perform graph feature extraction, to obtain at least two pieces of first representation sub-information each corresponding to historical query information in one of the at least two first paths, and at least two pieces of second representation sub-information each corresponding to media content corresponding to historical query information in one of the at least two second paths;

merge the at least two pieces of first representation sub-information to obtain the first sample representation information; and merge the at least two pieces of second representation sub-information to obtain the second sample representation information.

14. The electronic device according to claim 13, wherein:

the loss is a first loss;

the at least one processor is further configured to execute the one or more instructions to, when adjusting the parameter of the feature extraction network:

adjust the parameter of the feature extraction network based on the first loss and a second loss, to obtain the graph feature extraction model; and the second loss is configured to guide the feature extraction network to enhance a correlation between various pieces of second representation sub-information corresponding to same media content and reduce a correlation between various pieces of second representation sub-information corresponding to different media content.

15. The electronic device according to claim 14, wherein the second loss is further configured to guide the feature extraction network to enhance a correlation between various pieces of first representation sub-information corresponding to same historical query information and reduce a correlation between various pieces of first representation sub-information corresponding to different historical query information.

16. The electronic device according to claim 14, wherein the at least one processor is further configured to execute the one or more instructions to, when separately inputting the first sub-graph and the second sub-graph into the feature extraction network to perform graph feature extraction, to obtain the at least two pieces of first representation sub-information and the at least two pieces of second representation sub-information:

for each first path of the at least two first paths, perform graph feature extraction and aggregation on information in the first path in a direction from an end point to a start point, to obtain the first representation sub-information corresponding to the first path; and for each second path of the at least two second paths, perform graph feature extraction and aggregation on information in the second path in a direction from an end point to a start point, to obtain the second representation sub-information corresponding to the second path.

17. A non-transitory computer-readable storage medium storing at least one instruction or at least one program that, when loaded and executed by at least one processor, causes the at least one processor to:

obtain a first heterogeneous graph, including constructing a first meta-path, the first meta-path including a first start information node representing historical query information and at least one first other information node representing media information, the media information including one media content and associated information about the media content, and the media content being in a query result corresponding to the historical query information and being operated by a user;

obtain a second heterogeneous graph, including constructing a second meta-path, the second meta-path including a second start information node representing the media content and at least one second other information node representing the query information or the associated information; and determine and store, train a feature extraction network based on the first heterogeneous graph and the second heterogeneous graph, to obtain a graph feature extraction model, comprising:

constructing a plurality of positive sample pairs and negative sample pairs based on a plurality of pieces of historical query information and media content corresponding to each of the plurality of pieces of historical query information;

for each sample pair in the plurality of positive sample pairs and the plurality of negative sample pairs, performing:

extracting, based on the first heterogeneous graph and the second heterogeneous graph, respectively, a first sub-graph corresponding to historical query information in the sample pair and a second sub-graph corresponding to media content corresponding to the historical query information; and separately inputting the first sub-graph and the second sub-graph into the feature extraction network to perform graph feature extraction, to obtain first sample representation information corresponding to the historical query information and second sample representation information corresponding to the media content corresponding to the historical query information; and adjusting a parameter of the feature extraction network based on a loss, to obtain the graph feature extraction model, the loss being configured to guide the feature extraction network to enhance a correlation between first sample representation information and second sample representation information in each of the positive sample pairs and reduce a correlation between first sample representation information and second sample representation information in each of the negative sample pairs; and input the media content into the graph feature extraction model to obtain representation information corresponding to the media content.

18. The non-transitory computer-readable storage medium according to claim 17, wherein the at least one instruction or at least one program further causes the at least one processor to:

construct a media content feature library based at least on the representation information;

perform, in response to receiving target query information, information extraction processing on the target query information, to obtain target representation information corresponding to the target query information; and query the media content feature library based on the target representation information, and determining, based on a query result, matching media content that matches the target query information.

* * * * *